United States Patent
Rottach et al.

(10) Patent No.: US 11,899,101 B2
(45) Date of Patent: Feb. 13, 2024

(54) PREDICTING THE COURSE OF A ROAD ON THE BASIS OF RADAR DATA

(71) Applicant: Elektrobit Automotive GmbH, Erlangen (DE)

(72) Inventors: Andreas Rottach, Schwalbach a. Ts. (DE); Mathias Trumpp, Schwalbach a. Ts. (DE); Stefan Frings, Schwalbach a. Ts. (DE); Dietmar Kling, Schwalbach a. Ts. (DE); Wilhelm Nagel, Schwalbach a. Ts. (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 723 days.

(21) Appl. No.: 17/026,445

(22) Filed: Sep. 21, 2020

(65) Prior Publication Data
US 2021/0088650 A1 Mar. 25, 2021

(30) Foreign Application Priority Data

Sep. 24, 2019 (EP) .................................... 19199369
Mar. 19, 2020 (EP) .................................... 20164100

(51) Int. Cl.
| | |
|---|---|
| *G01S 13/931* | (2020.01) |
| *B60W 40/06* | (2012.01) |
| *G01S 13/89* | (2006.01) |
| *G06N 3/08* | (2023.01) |
| *G06V 20/56* | (2022.01) |
| *G06F 18/23* | (2023.01) |
| *G06V 10/762* | (2022.01) |
| *G06V 10/771* | (2022.01) |

(52) U.S. Cl.
CPC ........... *G01S 13/931* (2013.01); *B60W 40/06* (2013.01); *G01S 13/89* (2013.01); *G06F 18/23* (2023.01); *G06N 3/08* (2013.01); *G06V 10/762* (2022.01); *G06V 10/771* (2022.01); *G06V 20/56* (2022.01); *G06V 20/588* (2022.01); *B60W 2420/52* (2013.01)

(58) Field of Classification Search
CPC ..... G01S 13/931; G01S 13/89; G06V 10/762; G06V 10/771; G06V 20/558; G06V 20/56
See application file for complete search history.

(56) References Cited

U.S. PATENT DOCUMENTS

| | | | | |
|---|---|---|---|---|
| 6,894,639 B1 * | 5/2005 | Katz | ................... | G06F 18/2135 706/15 |
| 10,528,824 B2 * | 1/2020 | Zou | .......................... | G06N 3/08 |
| 10,628,671 B2 * | 4/2020 | Zang | .................... | G03B 15/006 |
| 11,500,099 B2 * | 11/2022 | Liang | ....................... | G06N 3/02 |

(Continued)

FOREIGN PATENT DOCUMENTS

DE 102018131477 6/2013

OTHER PUBLICATIONS

Search Report dated Mar. 19, 2021 issued in European Patent Application No. 20164100.

(Continued)

*Primary Examiner* — Peter M Bythrow
(74) *Attorney, Agent, or Firm* — Cozen O'Connor

(57) ABSTRACT

A method, a computer program with instructions, and a device for predicting a course of a road based on radar data of a motor vehicle. The radar data to be processed is received and then accumulated in a measuring grid. Subsequently, clusters are formed for objects in the measuring grid. Cluster descriptions are generated for the clusters. The resulting clusters are processed to determine polynomials for describing the road edges. The polynomials are finally output for further use.

8 Claims, 12 Drawing Sheets

(56) References Cited

U.S. PATENT DOCUMENTS

| | | | |
|---|---|---|---|
| 2005/0232512 A1* | 10/2005 | Luk | G06F 18/256 382/190 |
| 2013/0218448 A1* | 8/2013 | Suzuki | G01S 13/931 701/300 |
| 2016/0096272 A1* | 4/2016 | Smith | G05D 1/0088 700/255 |
| 2017/0337432 A1* | 11/2017 | Maeda | G06V 20/588 |
| 2018/0330238 A1* | 11/2018 | Luciw | G06V 10/454 |
| 2019/0146497 A1* | 5/2019 | Urtasun | G06V 10/82 701/27 |
| 2019/0180115 A1* | 6/2019 | Zou | G06N 3/08 |
| 2019/0266418 A1* | 8/2019 | Xu | G06F 18/24143 |
| 2019/0384304 A1* | 12/2019 | Towal | G06N 3/08 |
| 2020/0026960 A1* | 1/2020 | Park | G06V 10/764 |
| 2021/0303925 A1* | 9/2021 | Hofmann | G06V 20/56 |

OTHER PUBLICATIONS

Wang et al., "Polynomial Regression Network for Variable-Number Lane Detection", ECCV 2016: 14th European Conference, [Lecture Notes in Computer Science], Oct. 11-14, 2016, Part I, pp. 719-734.

Florian Homm et al. "Efficient Occupancy Grid Computation on the GPU with Lidar and Radar for Road Boundary Detection", 2010 IEEE Intelligent Vehicles Symposium, University of California, Jun. 21-24, 2010.

Yihuan Zhang et al. "3D LIDAR-based Intersection Recognition and Road Boundary Detection Method for Unmanned Ground Vehicle", 2015 IEEE 18th International Conference on Intelligent Transportation Systems.

Robert E. Soodak "Two-Dimensional Modeling of Visual Receptive Fields Using Gaussian Subunits" Dec. 1986.

H. Kong et al.: "Vanishing Point Detection for Road Detection", 2009 IEEE Conference on Computer Vision and Pattern Recognition (2009), pp. 96-103.

A. Polychronopoulos et al. "Integrated Object and Road Boarder Tracking Using 77 GHZ Automotive Radars", Dec. 2004.

W.S. Wijesoma et al. "Road-Boundary Detection and Tracking Using Ladar Sensing", IEEE Transactions on Robotics and Automation, vol. 20, No. 3, Jun. 2004.

Wende Zhang "LIDAR-Based Road and Road Edge Detection", 2010 IEEE Intelligent Vehicles Symposium, University of California, Jun. 21-24, 2010.

\* cited by examiner a)

b)

c)

PREDICTING THE COURSE OF A ROAD ON THE BASIS OF RADAR DATA

BACKGROUND OF INVENTION

1. Field of the Invention

The present invention relates to a method, a computer program with instructions, and a device for predicting the course of a road on the basis of radar data, in particular radar data of a radar sensor of a motor vehicle.

2. Description of Related Art

The number of accidents in road traffic can be reduced significantly by the use of driver assistance systems. For this purpose, driver assistance systems can take over when dangerous situations occur. Initial attempts to make car driving safer were simple assistance systems, such as, for example, brake assistants. In the meantime, the development is toward fully autonomous vehicles. The aim of this development is to reduce accidents to a minimum.

In addition to increased safety, driver assistance systems can also be used for increasing comfort, in that the driver is relieved of some driving tasks. Examples of such driver assistance systems are lane keeping assistants and adaptive cruise control. Other driver assistance systems can contribute to reducing fuel consumption, in that they plan accelerating and braking maneuvers in advance. In the future, fully autonomous vehicles could also make it possible for the flow of traffic to be controlled by corresponding systems for reducing traffic jams.

In order to realize systems that are capable of making decisions, a comprehensive view of the environment must be modeled. The increasing complexity of such assistance systems requires ever more accurate models. Therefore, real-time data from various types of sensors that are integrated in the vehicle are fused into a comprehensive consistent representation of the surrounding area.

Since many driver assistance systems and autonomous vehicles require information about the road ahead of the vehicle and its relative position, systems for detecting the traffic lane and the edges of the road are of great importance. This information can be used for assisting the driver in navigational tasks and for determining the location of the vehicle in the surrounding area.

For detecting the traffic lane and the edges of the road, a series of technologies that are based on the evaluation of camera data, lidar data, or radar data already exist.

For example, the article "Vanishing point detection for road detection" by H. Kong et al. [1] describes an approach to the segmentation of a road area from a single image. The approach is based on the estimation of a vanishing point of the road using a locally adaptive soft voting algorithm. The estimated vanishing point is then used as a constraint for ascertaining two dominant edges for the segmentation of the road area.

DE 10 2018 131 477 A1 describes a method for controlling a vehicle. In the method, image data of a multiplicity of cameras of the vehicle are received and combined. On the basis of the combined image data, traffic lane features are classified and localized using an artificial neural network. On the basis of the classified and localized traffic lane data, fused traffic lane feature data are generated by a data fusion process On the basis of these fused traffic lane feature data, the vehicle is controlled.

The article "Lidar-based road and road-edge detection" by W. Zhang [2] describes a LIDAR-based method for detecting roads and roadway edges. The lidar data is decomposed into signals based on elevation and signals projected onto the ground plane. First, the elevation-based signals are processed by filtering techniques to identify a candidate region for a road. It is determined by pattern recognition techniques whether the candidate region is a road segment. Then, a line representation of the signals projected onto the ground plane is identified and compared with a simple road model in a top-down view to determine whether the candidate region is a road segment with associated road edges.

The article "Efficient occupancy grid computation on the GPU with lidar and radar for road boundary detection" by F. Homm et al. [3] describes an approach to fast computation of occupancy grid maps with laser range-finders and radar sensors. The approach uses a GPU to overcome the restrictions of classic occupancy grid computation in the automobile sector. By a histogram-based approach, road edges can thus be detected with the aid of the occupancy grid maps.

Many of the more recent approaches are based on manually created features, predefined models or heuristics, in order to create a meaningful description of the road edges. These systems are intended for use on freeways and can fail in complex scenarios, such as for example in urban areas. Approaches that are based on occupancy grids and free spaces are more flexible in their assisted road geometry. Free space models can however identify all areas suitable for driving and are not confined to the actual road. Therefore, even parking spaces, freeway ramps and other undesired areas could also be included in the free space.

On account of the increasing popularity of convolutional neural networks (CNNs), approaches based on machine learning concentrate primarily on camera-based image systems.

SUMMARY OF THE INVENTION

It is an object of one aspect of the present invention to provide improved solutions for predicting the course of a road on the basis of radar data of a radar sensor of a motor vehicle.

According to a first aspect of the invention, a method for predicting the course of a road on the basis of radar data of a radar sensor of a motor vehicle comprises:
  receiving the radar data;
  accumulating the radar data in a measuring grid;
  forming clusters for objects in the measuring grid;
  processing the clusters to determine polynomials for describing the road edges; and
  outputting the polynomials.

According to a further aspect of the invention, a computer program comprises instructions which, when executed by a computer, cause the computer to perform the following steps for predicting the course of a road on the basis of radar data of a radar sensor of a motor vehicle:
  receiving the radar data;
  accumulating the radar data in a measuring grid;
  forming clusters for objects in the measuring grid;
  processing the clusters to determine polynomials for describing the road edges; and
  outputting the polynomials.

The term "computer" is intended to be understood in broad terms. In particular, it also comprises control devices, controllers, embedded systems and other processor-based data processing devices.

The computer program may for example be provided for electronic retrieval or be stored on a computer-readable storage medium.

According to a further aspect of the invention, a device for predicting the course of a road on the basis of radar data of a radar sensor of a motor vehicle is designed for:
receiving the radar data;
accumulating the radar data in a measuring grid;
forming clusters for objects in the measuring grid;
processing the clusters to determine polynomials for describing the road edges; and
outputting the polynomials.

For this purpose, the device preferably has:
a receiving module for receiving the radar data;
a pre-processing module for accumulating the radar data in a measuring grid and for forming clusters for objects in the measuring grid;
a processing module for processing the clusters to determine polynomials for describing the road edges; and
an output module for outputting the polynomials.

In the case of the solution according to the invention, radar data of a traveling vehicle are pre-processed and thereby combined into related objects. This leads to a significant reduction in the complexity and noise, since the entire measuring grid can be abstracted by a set of clusters for the objects. For estimating the course of a road, the resultant radar clusters are subsequently processed. The course of a road is thereby modeled as a polynomial for the left and right sides of the road. The solution described allows relatively simple modeling of the problem, without having to revert to manually designed heuristics. As a result, this reduces the number of possible errors in the code and allows a simple structured program with at the same time better performance, depending on availability of the data. With a greater amount of available data, a greater accuracy of detection is achieved and also better handling of difficult scenarios. The more data are available, the better the predictions become. Since no manual treatment is necessary for any special cases, the solution according to the invention is simpler and more flexible than known solutions.

According to one aspect of the invention, cluster descriptions are generated for the clusters. Preferably, the cluster descriptions respectively comprise a center of the cluster and a description of an envelope of the cluster in the form of an envelope polygon. An envelope polygon allows the form of an object or of the cluster to be described in approximation. In addition, a bounding box can be determined for the cluster. Additional information can be included in the cluster descriptions, such as for example a probability indicating how probable it is that an object is moving. Further information may be the probability of the existence of a detected object.

According to one aspect of the invention, the clusters are transformed into a feature space by means of a receptive field. For this purpose, the clusters may be convoluted with the individual receptors of the receptive field. A receptive field, consisting for example of 50 to 500 receptors, serves for representation of the features for the further regression. The receptive field of an individual receptor is in this case defined by the Probability Density Function (PDF) of a 2D normal distribution of a finite extent. The extent is defined by a threshold value for the maximum distance from the center of the receptor. Stimuli that are closer to the center of the receptor produce a stronger response. In other words, the clusters or the descriptions of their envelopes are correlated with the individual receptors and thereby transformed into a feature space with a fixed number of dimensions. Each receptor represents a dimension in the feature space. In comparison with known typical convolutional neural networks, which operate on images, only a few hundred values are generated by the receptive field. By contrast, a convolutional neural network usually has many feature maps of different sizes, which in each case contain 2D arrays with features, and as result require more computing power and storage space. The evaluation of receptive fields can be carried out particularly efficiently in parallel, for example on a graphics card.

According to one aspect of the invention, the centers of the receptors and the covariance matrices of the receptors are determined manually or by evolutionary algorithms. The quality of the extraction of a feature depends on the position, the orientation and the form of individual receptors making up the receptive field. Intuitively, for example a regular grid or a regular hexagonal grid can be realized. Alternatively, circular arrangements can also be used. Particularly advantageously, evolutionary strategies are applied to the receptive field, since an improved representation of the feature space of the radar clusters can be achieved by the evolution of receptors and the thereby obtained optimization of the quality of the road detection.

According to one aspect of the invention, the description of the clusters in the feature space serves as an input variable for a neural network. The neural network is in this case preferably trained for the regression of parameters of the polynomials for describing the road edges. The receptive field and the neural network can advantageously also be realized as a pipeline. The neural network considers the object clusters detected by the radar from a 2D top-down view of the area around the vehicle. For example, guardrails can be detected in the radar data. The course of the guardrails along the roadway is used by the neural network to estimate the course of the road. The capabilities of the system depend mainly on the training data chosen. New, unknown scenarios or special cases can be learned, in that more training data are prepared, i.e. just by generating reference data that comprise radar data plus the associated course of the road. An adaptation of the algorithm is not necessary. A particular kind of dynamics is achieved by the use of a neural network. The neural network usually provides smooth, uniformly changing outputs. In comparison with other approaches, there are fewer abrupt changes in the output.

An error function, which minimizes the error of the output polynomials, i.e. the prediction, in the geometrical space, i.e. in the ego coordinate system of the vehicle, instead of directly optimizing the polynomial parameter vector, may be used for training the neural network. This ensures that the network is better able to generalize in the case of unknown scenarios. The neural network is advantageously realized with the aid of existing libraries, for example Keras, Tensorflow, Caffe, Torch, Theano, etc.

Preferably, a method according to the invention or a device according to the invention is used in a motor vehicle, for example in a partly autonomous motor vehicle, an autonomous motor vehicle or a motor vehicle equipped with at least one assistance system. For example, a solution according to the invention can be used for predicting the course of a road on freeways, highways and, with sufficient data, also in urban areas. The predicted course of a road can be used for a multiplicity of assistance systems, such as for example lane keeping assistants.

Further features of the present invention are evident from the following description and the appended claims in conjunction with the figures.

DETAILED DESCRIPTION OF THE PRESENTLY PREFERRED EMBODIMENTS

For better understanding of the principles of the present invention, embodiments of the invention are explained in more detail below on the basis of the figures. The same reference signs are used in the figures for elements that are the same or have the same effect and are not necessarily described again for every figure. It goes without saying that the invention is not restricted to the embodiments represented and that the features described can also be combined or modified without departing from the scope of protection of the invention as it is defined in the appended claims.

Figure 1:
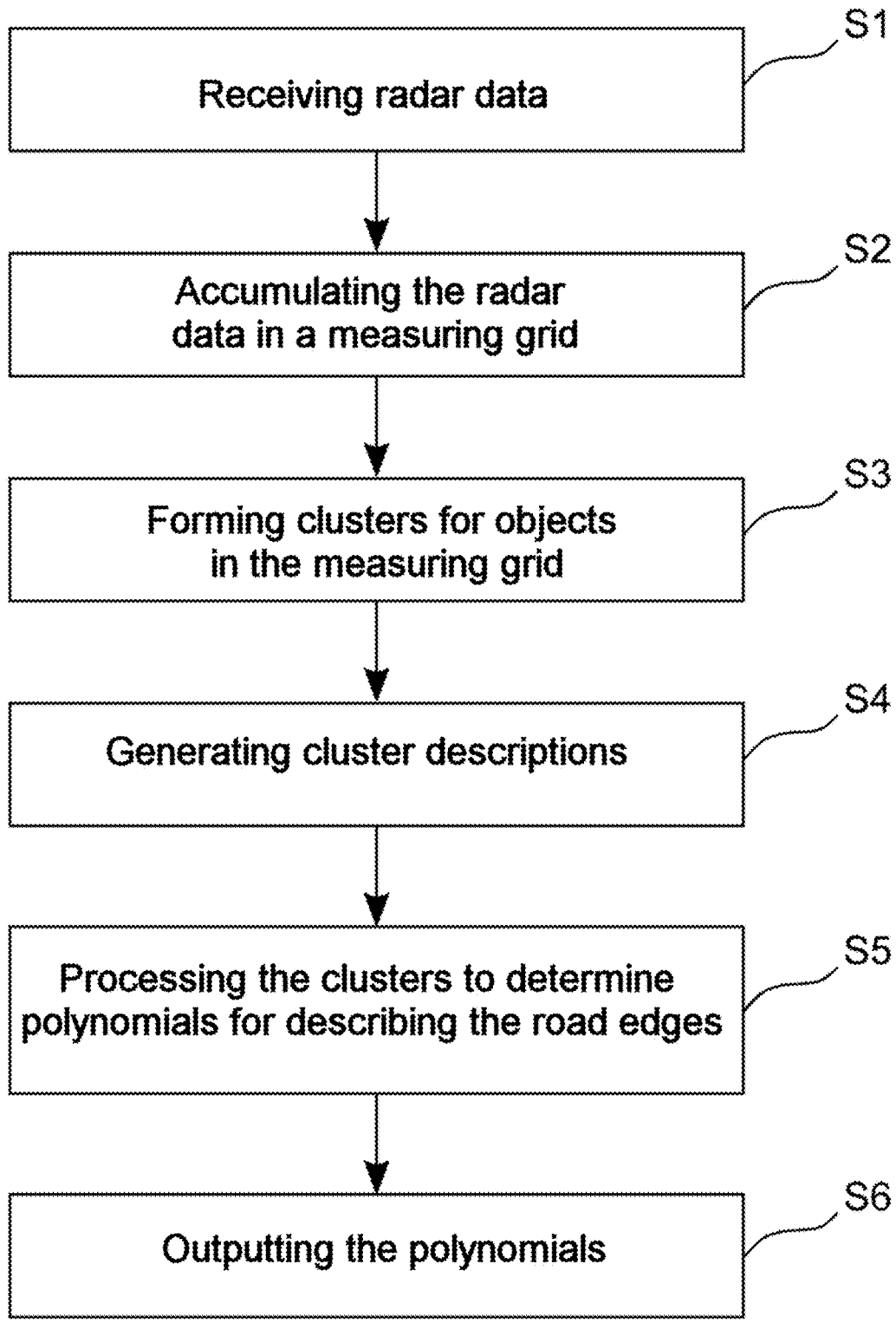
FIG. 1 schematically shows a method for predicting the course of a road on the basis of radar data of a radar sensor of a motor vehicle.

FIG. 1 schematically shows a method for predicting the course of a road based at least in part on radar data of a radar sensor of a motor vehicle. In a first step S1, the radar data to be processed is received and then accumulated in a measuring grid S2. Subsequently, clusters are formed for objects in the measuring grid S3. Cluster descriptions are also generated for the clusters S4. The cluster descriptions describe, for example, in each case a center of the cluster, a description of an envelope of the cluster in the form of an envelope polygon and a bounding box. The resulting clusters are processed S5, to determine polynomials for describing the road edges. In the processing S5, the clusters may first be transformed into a feature space by a receptive field. For this purpose, the clusters are, for example, convoluted with the individual receptors of the receptive field. The centers of the receptors and the covariance matrices of the receptors may be determined manually or by evolutionary algorithms. The description of the clusters in the feature space then serves as an input variable for a neural network that is trained for the regression of parameters of the polynomials for describing the road edges. The polynomials ascertained are finally output for further use S6.

Figure 2:
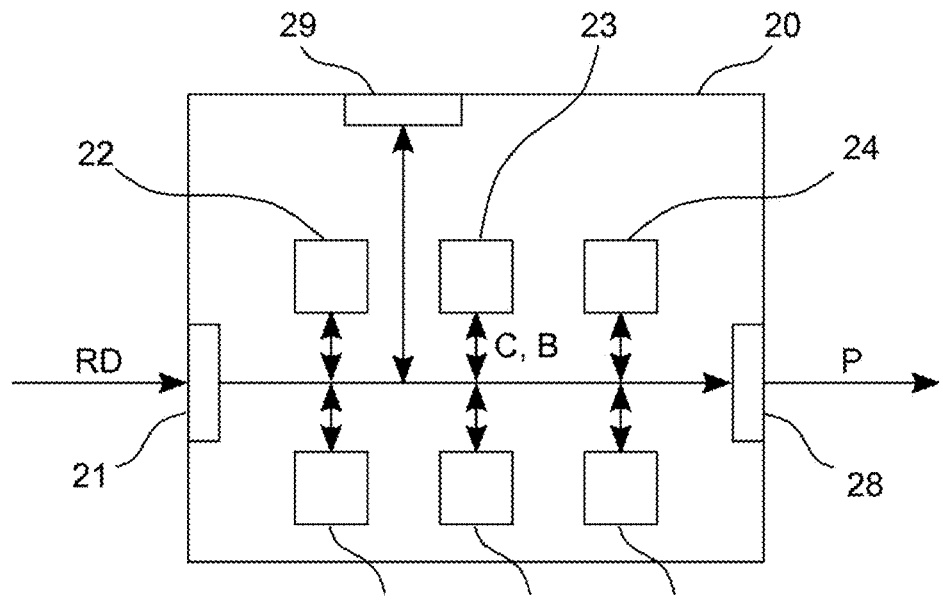
FIG. 2 schematically shows a device for predicting the course of a road on the basis of radar data of a radar sensor of a motor vehicle.

FIG. 2 shows a simplified schematic representation of a first embodiment of a device 20 for predicting the course of a road based at least in part on radar data RD of a radar sensor of a motor vehicle. The device 20 has an input 21, by way of which a receiving module 22 receives the radar data RD to be processed. A pre-processing module 23 accumulates the radar data RD in a measuring grid and forms clusters C for objects in the measuring grid. The pre-processing module 23 may also generate cluster descriptions B for the clusters C. The cluster descriptions B comprise, for example, in each case a center of the cluster C, a description of an envelope of the cluster C in the form of an envelope polygon and a bounding box. A processing module 24 processes the clusters C to determine polynomials P for describing the road edges. For this purpose, the processing module 24 may first transform the clusters C into a feature space by a receptive field, in that the clusters C are for example convoluted with the individual receptors of the receptive field. The centers of the receptors and the covariance matrices of the receptors may be determined manually or by evolutionary algorithms. The description of the clusters C in the feature space then serves as an input variable for a neural network that is trained for the regression of parameters of the polynomials P for describing the road edges. The polynomials P determined by the processing module 24 can be output by an output module 25 by way of an output 28 of the device 20 for further use.

The various modules 22-25 may be controlled by a control module 26. If appropriate, settings of the modules 22-26 may be changed by way of a user interface 29. If required, the data occurring in the device 20 may be stored in a memory 27 of the device 20, for example for later evaluation or for use by the components of the device 20. The modules 22-26 may be realized as dedicated hardware, for example as integrated circuits. Of course, they may however also be partly or completely combined or implemented as software that runs on a suitable processor, for example a GPU or a CPU. The input 21 and the output 28 may be implemented as separate interfaces or as a combined bidirectional interface.

Figure 3:
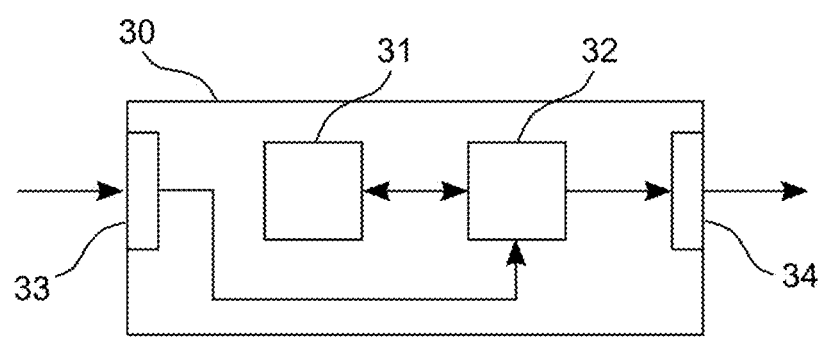
FIG. 3 schematically shows a device for predicting the course of a road on the basis of radar data of a radar sensor of a motor vehicle.

FIG. 3 shows a simplified schematic representation of a second embodiment of a device 30 for predicting the course of a road based at least in part on radar data of a radar sensor of a motor vehicle. The device 30 has a processor 32 and a memory 31. For example, the device 30 is a control device or a controller. Stored in the memory 31 are instructions which, when executed by the processor 32, cause the device 30 to perform the steps according to one of the methods described. The instructions stored in the memory 31 consequently embody a program that can be executed by the processor 32 and is realized by the method according to the invention. The device 30 has an input 33 for receiving radar data. Data generated by the processor 32 is provided by way of an output 34. In addition, they may be stored in the memory 31. The input 33 and the output 34 may be combined to form a bidirectional interface.

The processor 32 may comprise one or more processor units, for example microprocessors, digital signal processors, or combinations thereof.

The memories 27, 31 of the devices described may have both volatile and nonvolatile memory areas and comprise a wide variety of storage devices and storage media, for example hard disks, optical storage media, or semiconductor memories.

Figure 4:
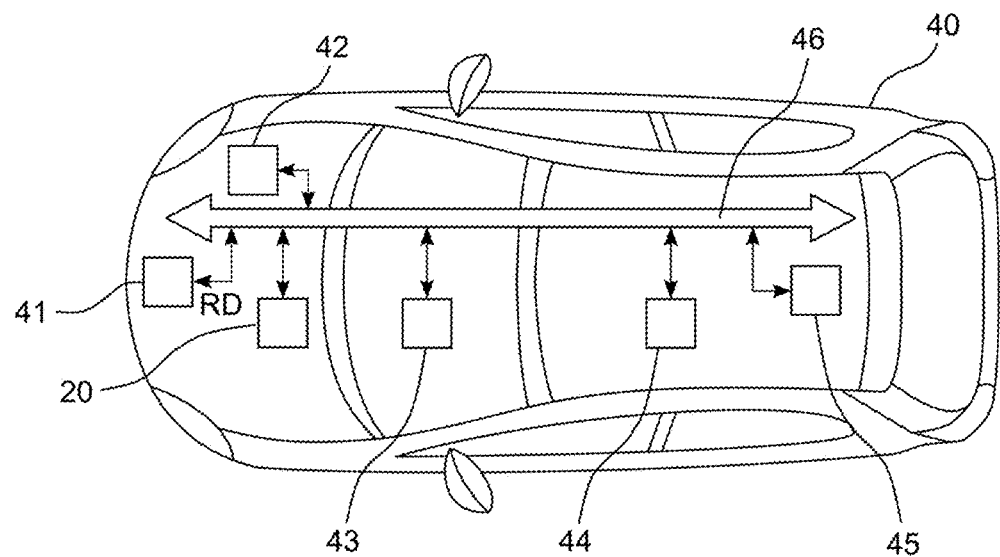
FIG. 4 schematically shows a motor vehicle in which a solution according to the invention is realized.

FIG. 4 schematically shows a motor vehicle 40, in which a solution according to one aspect of the invention is realized. The motor vehicle 40 has a radar sensor 41, with which radar data RD of a surrounding area of the motor vehicle 40 are captured. The motor vehicle 40 also has a device 20 for predicting the course of a road based at least in part on the radar data RD. Polynomials P, determined by the device 20, for describing the road edges are output to at least one assistance system 42 of the motor vehicle 40. The device 20 may of course also be integrated in the assistance system 42. Further component parts of the motor vehicle 40 in this example are a navigation system 43, by which positional information can be provided, and also a data transmission unit 44. Using the data transmission unit 44, for example, a connection to a back-end can be set up to obtain updated software. For storing data, a memory 45 is present. The data exchange between the various components of the motor vehicle 40 takes place by way of a network 46.

Additional details of the invention are to be described below on the basis of FIG. 5 to FIG. 17.

In road construction, clothoids are used for modeling the geometry of the road. A clothoid is a plane curve that is uniquely defined in the plane to the extent of similarity by the property that the curvature at each point of the curve is proportional to the length of its arc up to this point. The curvature consequently changes linearly along the curve. Clothoids allow smooth transitions between circles and straight line segments. They can be approximated in portions by polynomials. Third degree polynomials are preferably used for this. At the transition point between the polynomials, first and second derivatives are set equal to 0. It is therefore appropriate to use polynomials for predicting the course of a road.

Figure 5:
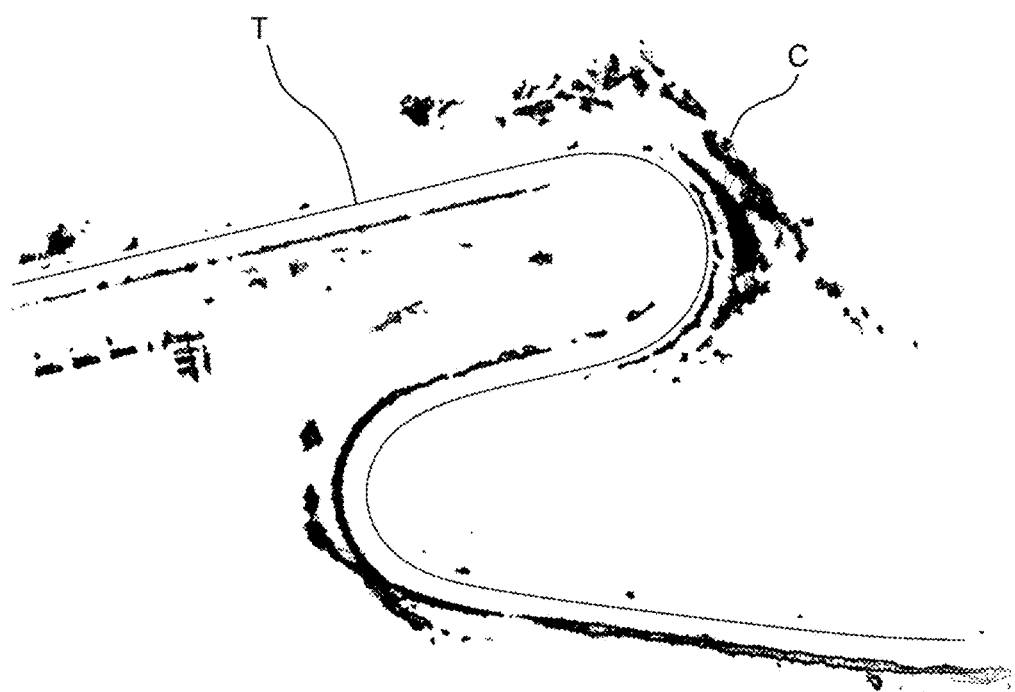
FIG. 5 shows clusters of radar data in a measuring grid.

The starting point for predicting the course of a road is a pre-processed representation of the surrounding area of the vehicle. The radar sensor of the vehicle continuously captures measurement data, which is accumulated in a measuring grid. The measuring grid serves the purpose of tracking the successive radar scans, smoothing them, and joining them together to form a coherent model of the surrounding area. Objects in the measuring grid are than grouped together into clusters C, for which a cluster description is respectively generated. The cluster description may contain information on the center of the cluster C, a label (obstacle, . . . ), a bounding box of the cluster C, aligned at the axes of the measuring grid, and a representation of the envelope of the cluster C in the form of a 2D polygon. FIG. 5 shows such clusters C of radar data in a measuring grid along a trajectory T of the vehicle. The clusters C are represented in world coordinates, with only immovable objects having been considered. FIG. 5 represents for purposes of illustration the data of the measuring grid in the world coordinate system over a greater time period, for example the last 10 seconds, not the view of a vehicle at a given point in time. Although accumulation also takes place with respect to an individual point in time, it is over much shorter time periods. In the representation, a road geometry can be clearly seen. The aim is to predict on the basis of the cluster data the position and form of the road edges. Challenges here are that the measuring grids contain a variable number of clusters C as input variables for the further processing, and that the clusters C for their part have a variable number of points for modeling the envelope polygon.

Figure 6:
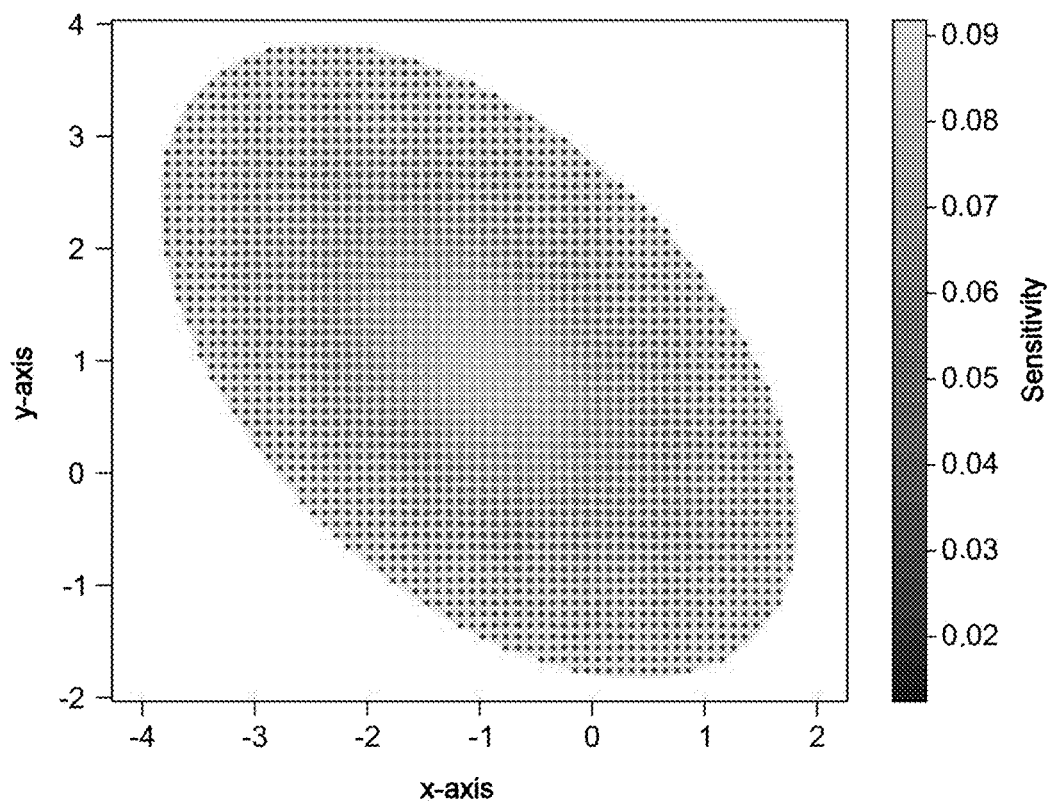
FIG. 6 schematically shows an example of a receptor.

According to one aspect of the invention, first a processing of the input data takes place, in which the radar clusters are transformed into a representation that is easier to handle. This transformation is based on a receptive field, i.e. an arrangement of receptors. Receptive fields originate from biology, where they can be found for example in the visual cortex of animals and humans. A receptive field represents a set of quasi sensors, for example with a Gaussian form and a response curve. The individual receptive field of each receptor is in this case defined as a 2D multivariate Gaussian probability density function of a finite extent. Generally, receptive fields may be of any desired forms. In the human visual system, for example, they are increasingly more complex from stage to stage. FIG. 6 schematically shows an example of a receptor. The ellipsis that can be seen represents the sensitive area. The individual points illustrate the sensitivity at various positions. With the aid of such Gaussian receptors, individual stimuli in point form can be transformed into an n-dimensional feature space, where n is equal to the number of receptors in the entire receptive field.

Figure 7:
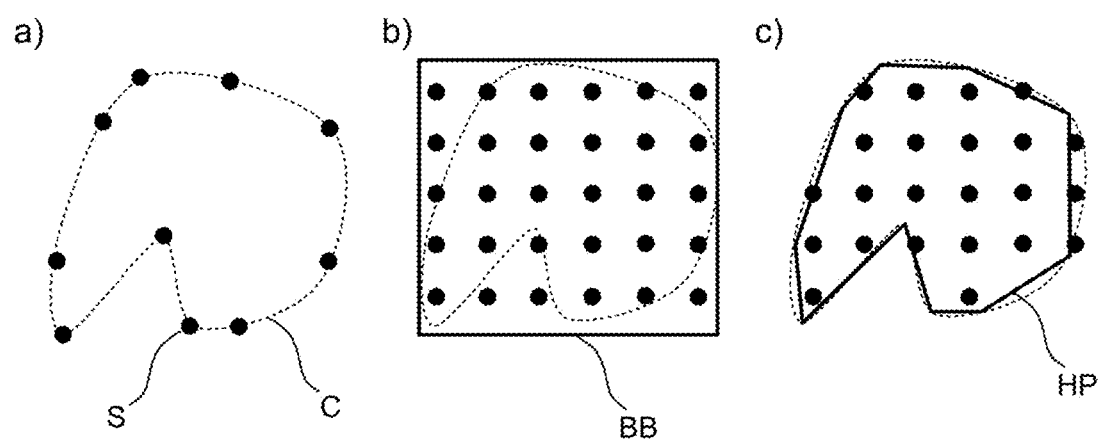
FIG. 7 illustrates various sampling models for the clusters.
Figure 8:
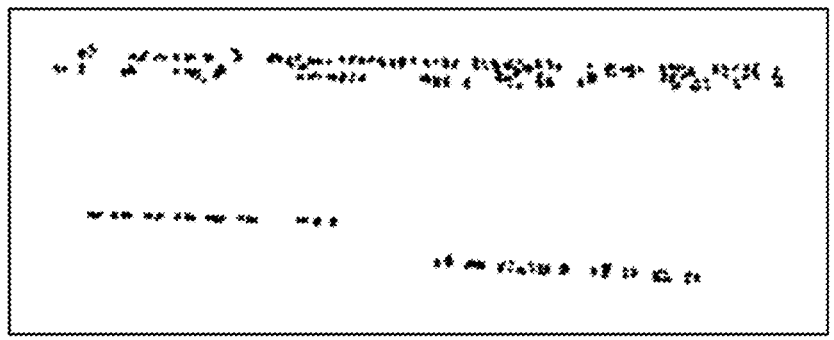
FIG. 8 shows the effect of the sampling models from FIG. 7.
Figure 8:
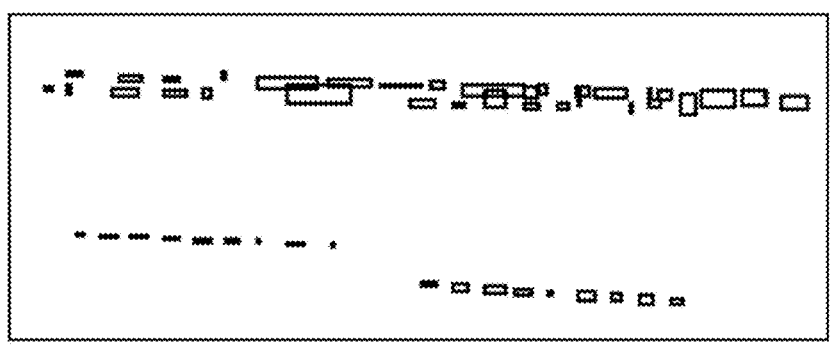
Figure 8:
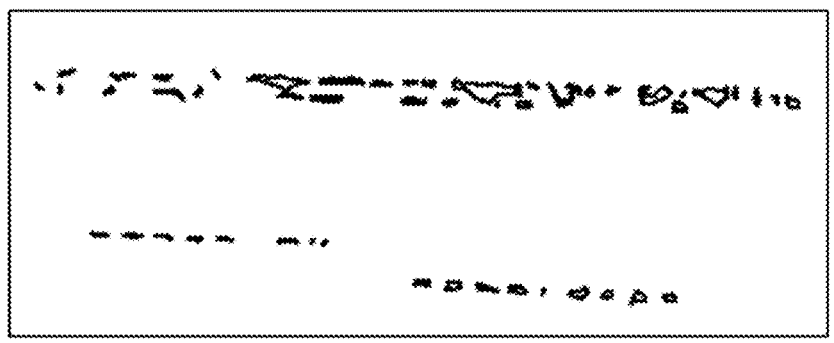

However, the radar clusters C are represented by their envelope polygons, which consist of individual connected points. The radar clusters C must therefore first be converted into a set of individual stimuli S. Various approaches based on different sampling models can be used for this FIG. 7 illustrates three such sampling models for the clusters C. The individual stimuli S are in this case illustrated by the black circles. FIG. 8 shows the effect of the sampling models from FIG. 7.

In the case of a first model, which is represented in FIG. 7a, the points of the envelope polygon are used directly, i.e. the connectivity information of the cluster envelopes is ignored and the envelope points of the clusters with respect to one point in time of the measuring grid are fed into the receptive field. This approach is a very rough approximation to the input data and ignores the connectivity information of the clusters completely. It also has two structural weaknesses. The first problem is that receptors that are completely within a single cluster cannot perceive the cluster itself, since only the envelope points are considered. A second problem is the fact that the envelope polygons do not necessarily have a constant sampling rate along the boundary. Different clusters with the same form and position can therefore lead to different receptor responses and the response is not proportional to the form and size of the cluster. This problem can be solved by renewed sampling of the polygon envelope along the boundary.

In the case of a second model, which is represented in FIG. 7b, a cluster C is represented by its bounding box BB, which is then sampled with a constant increment of for example 50 cm along the x-axis and the y-axis. In this case, the receptor responses to a cluster are proportional to the size of its bounding box. Also, if they are within a cluster, small receptors do not miss any stimulus S. A disadvantage of this approach is the fact that an axis-oriented bounding box BB once again represents a rough approximation for any polygon envelopes.

In the case of a third model, which is represented in FIG. 7c, the surface area of the envelope polygon HP is sampled, i.e. once again at a constant increment of 50 cm along the x-axis and the y-axis. The set of stimuli S then contains all of the sampling points that lie within the polygon. This approach increases the plausibility of the transformation of the radar clusters into the feature space, but also increases the computational complexity, since hundreds or even thousands of envelope polygons have to be rendered and the respective points extracted.

This task is comparable to the pre-processing that is required for the direct application of CNNs. One possibility is to render the radar clusters initially as a binary or grayscale image of a certain intensity. All pixel coordinates that correspond to the clusters are extracted from the image and transformed back into the ego coordinate system in which the receptors are located. After that, the response of the receptors to the set of stimuli thus ascertained can be calculated.

Figure 9:
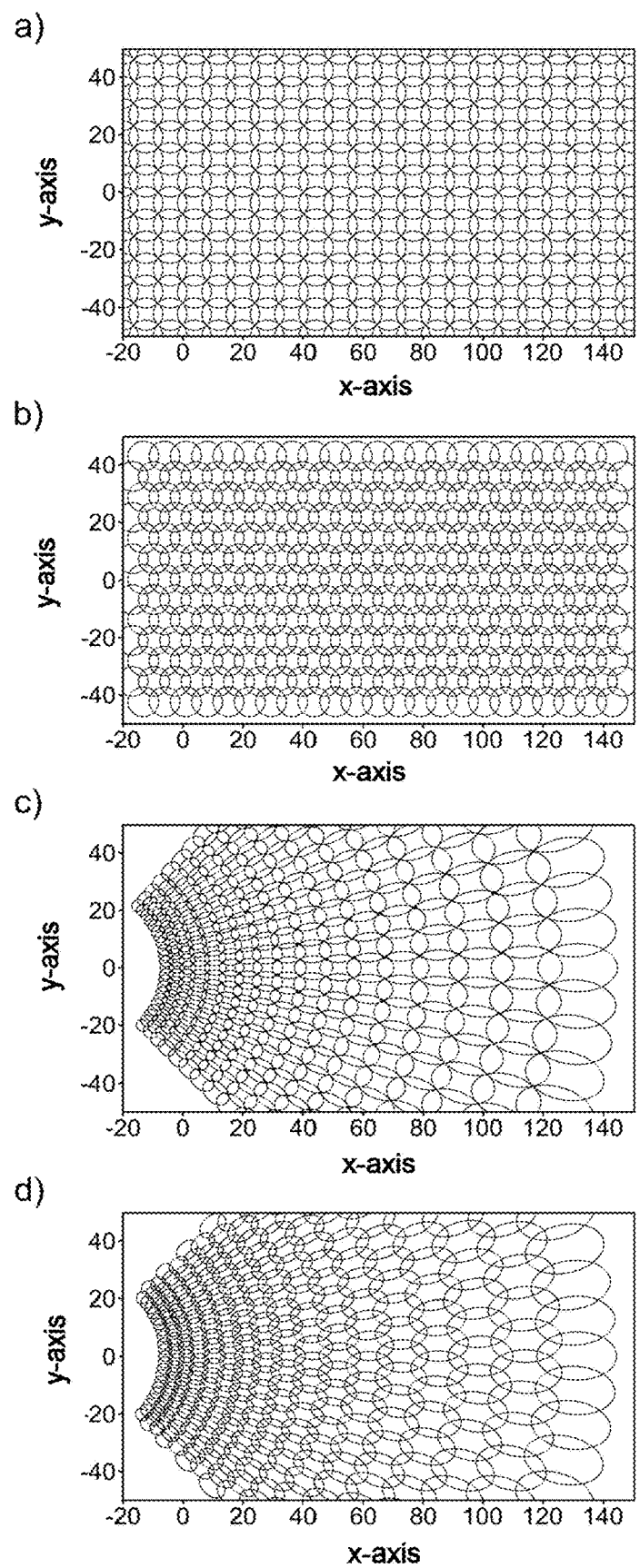
FIG. 9 schematically shows various arrangements of receptors.

The receptors can be arranged in various ways. FIG. 9 schematically shows four different arrangements of receptors. FIG. 9a shows a regular grid, FIG. 9b a regular grid with a hexagonal arrangement, FIG. 9c a circular arrangement, and FIG. 9d a circularly hexagonal arrangement.

The regular grid in FIG. 9a consists of identically formed receptors of a constant extent in the x and y directions and a fixed distance along the x-axis and y-axis. The variances are chosen such that the entire input space is covered, which leads to slight overlaps between the neighboring receptors. This approach is not orientation-selective, but it can be used in combination with CNN-based systems, since the feature channels can be transformed into a 2D image.

The regular grid with a hexagonal arrangement in FIG. 9b is a variation of the regular grid in which the layout is not rectangular but hexagonal. Every second row of receptors is offset along the x-axis by half the fixed receptor spacing. As a result, aliasing artefacts that can occur if there are stimuli between two neighboring receptors can be reduced.

The circular arrangement in FIG. 9c consists of receptors that are located on a series of lines that have a common origin, for example 30 meters behind the vehicle. The lines are arranged at the same spacing between ±45°. The receptor spacing is proportional to the logarithm of the distance from the origin, which ensures a higher sampling rate closer to the origin. The variances are once again chosen such that all of the regions between the receptors are filled. This design increases the resolution closer to the vehicle, but reduces the sampling further away. It also leads to receptors with a selectivity with respect to a preferred orientation.

The circularly hexagonal arrangement in FIG. 9d is a variation of the circular arrangement. In the case of this approach, the same receptor spacing along the lines that extend from the common origin and the same circular arrangement are used, but every second ring of receptors is turned about the origin by an angle that corresponds to half the angle between two neighboring lines. This leads to a sampling pattern that resembles a hexagonal arrangement, which once again reduces aliasing artefacts.

Irrespective of the chosen arrangement, all of the responses in a receptive field are evaluated in order to form a feature vector. The feature vector can then be used as an input for any desired regression model.

Instead of generating receptive fields manually, genetic algorithms may be used for generating the receptive fields. For this purpose, the receptive fields are coded into a vector with real values, which represents a genome. The fitness of the receptive field is defined by the sum of the captured input variance of all the receptors and also by a negative training loss. The receptive fields are then developed by applying genetic operators, in particular by applying a mutation operator and a crossover operator. The mutation operator uses Gaussian noise, while the crossover operator is preferably based on single-point crossover More powerful individuals have a greater chance of reproduction. Therefore, the fitness increases after each generation.

Figure 10:
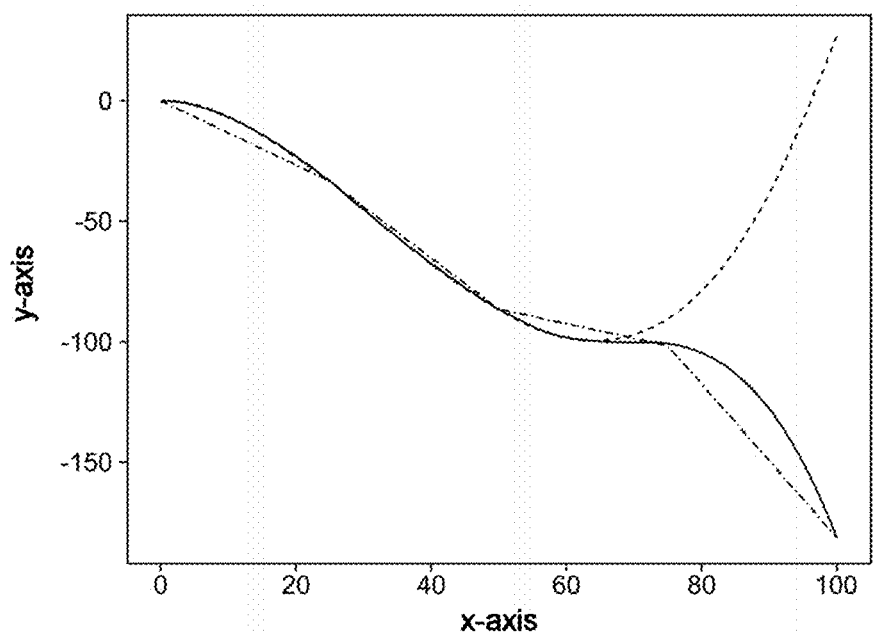
FIG. 10 shows examples of output models for describing road edges.

For predicting the road edges by a neural network, various output models for the polynomials come into consideration. Some examples of output models for describing the road edges are represented in FIG. 10. The parameters for describing the polynomials are highly non-linear and influence the geometrical form in various ways. This makes the learning of a regression model more difficult, so that it is a good idea to make some simplifications. For example, the starting point of the prediction window is set equal to 0 for all models. This simplification has no adverse effect on the results.

The solid line illustrates a description by polynomials defined in portions, where a variable or fixed window size can be used. This is a very complex representation with restrictions, which also requires an adapted loss function for the training of the neural network. Based the receptor responses alone, the window size can only be predicted with difficulty. Therefore, the window size is preferably set to a constant value.

The description by polynomials defined in portions can be relatively difficult to learn for a neural network. Therefore, a description by a single polynomial may alternatively be implemented, which is illustrated in FIG. 10 by the dashed line. Here, too, a variable or fixed window size may again be used, a fixed window size being preferred. The representation is likewise relatively complex, but has fewer restrictions. However, in this case too an adapted loss function is required for the training of the neural network.

A description as a polygon progression comprising linearly interpolated points with a constant spacing of the interpolation points on the x-axis comes into consideration as a further alternative. Such a polygon progression is illustrated in FIG. 10 by the dash-dotted line. The window size is preferably set to a constant value. This approach simplifies the representation, but increases the dimensionality of the output space. The regression model ascertains the y-coordinates for a list of fixed x-coordinates ahead of the vehicle. As a result, although the implied smoothness in comparison with the polynomial representations is lost, the flexibility of the model increases and the representation of the prediction is simplified in comparison with the more complex polynomial models. If a small number of sampled coordinates is used, a polynomial can be adapted with a simple least-squares solver to the points ascertained, in order to reconstruct a polynomial description of the road edges.

Figure 11:
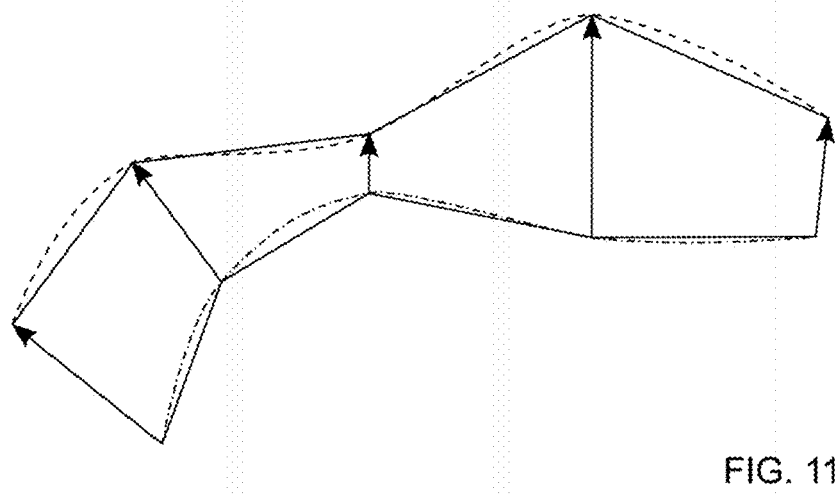
FIG. 11 illustrates a loss function in the geometrical space.

The regression model is preferably trained directly to the parameter vector. However, similar solutions in the parameter space are not necessarily also similar in the geometrical space. Therefore, an adapted loss function is preferably used. Instead of calculating the prediction errors in the parameter space, a loss is defined in the geometrical space. This can be realized by sampling polynomials in the ego coordinate system at equidistant points along the x-axis. FIG. 11 illustrates such a loss function, in the case of which the average length of the arrows that represent the deviation between the basic truth (dashed line) and the prediction (dash-dotted line) is minimized.

For learning the mapping between the input data and the output data, various regression models can be implemented by the network architectures. These are represented in FIG. 12 to FIG. 15. The box at the bottom represents the feature space 51, which was obtained by applying the receptive field to the input data. The box at the top represents the output layer 2, which generates a prediction for the left/right/combined road geometry.

Figure 12:
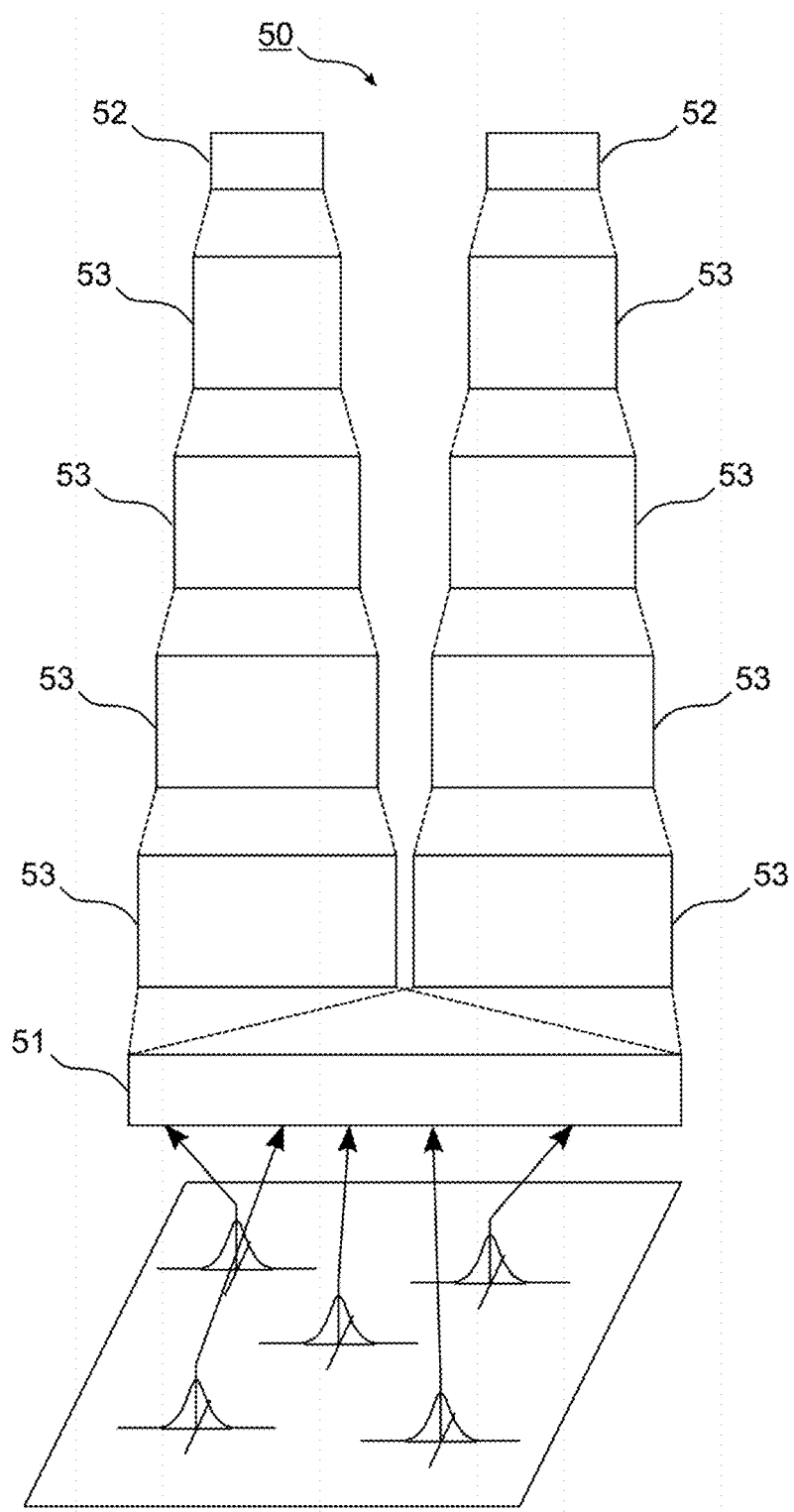
FIG. 12 shows two separate networks for the left and right road edges.

FIG. 12 shows two separate networks 50 for the left and right road edges. In the case of this approach, two simple, independent fully connected neural networks 50 predict the left and right road borders separately, without the possibility of exchanging information between the networks 50. Each of the neural networks 50 has a series of dense or fully connected layers 53. The feature space 51 is in this case a one-dimensional feature vector.

Figure 13:
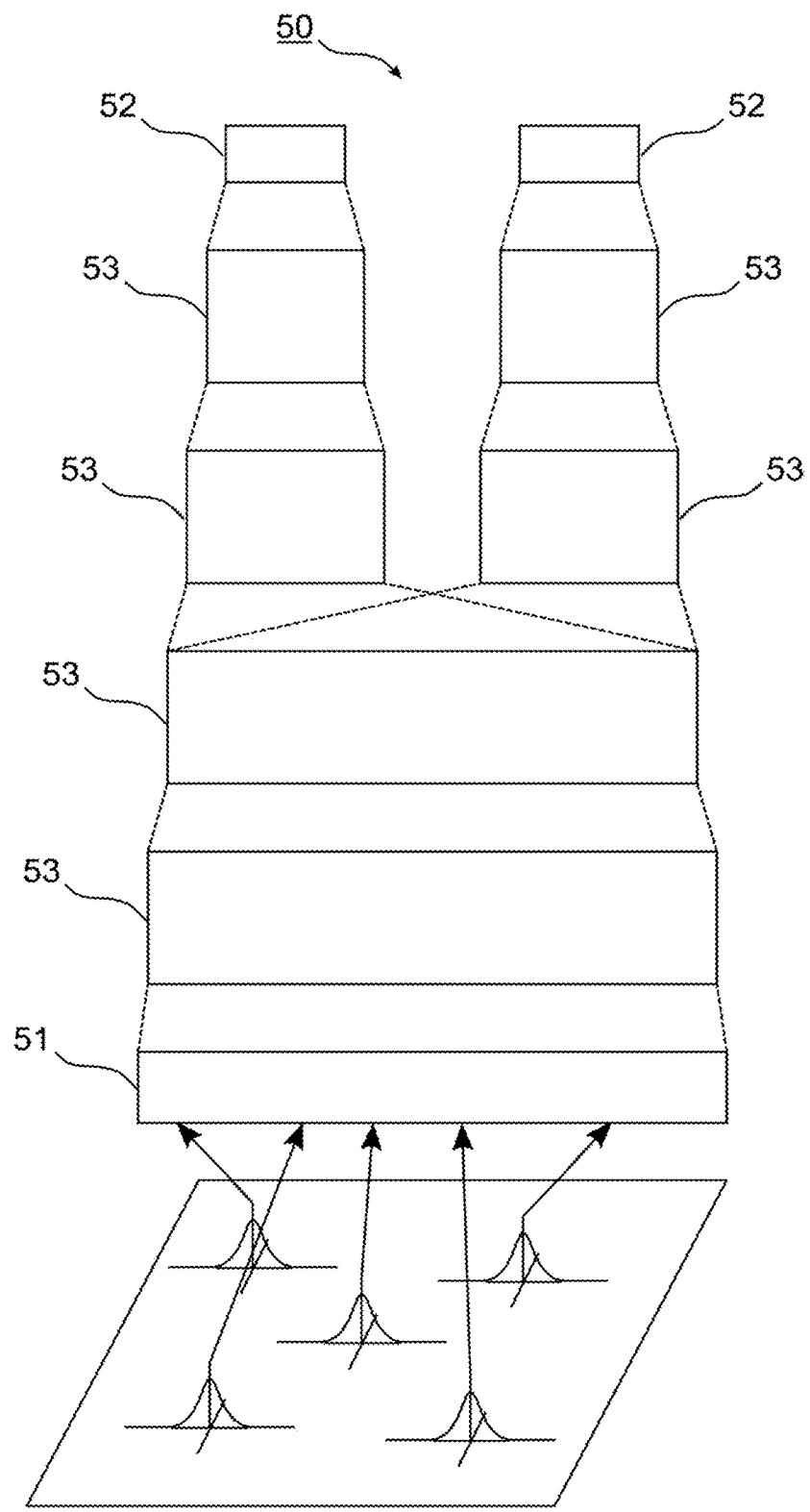
FIG. 13 shows a network with shared layers and task-specific layers.

FIG. 13 shows a network 50 with several shared dense or fully connected layers 53 and several task-specific dense or fully connected layers 53. This network 50 sets up common and task-specific features for the left and right road edges. Two separate output layers 52 predict the individual road edges. The feature space 51 is once again a one-dimensional feature vector.

Figure 14:
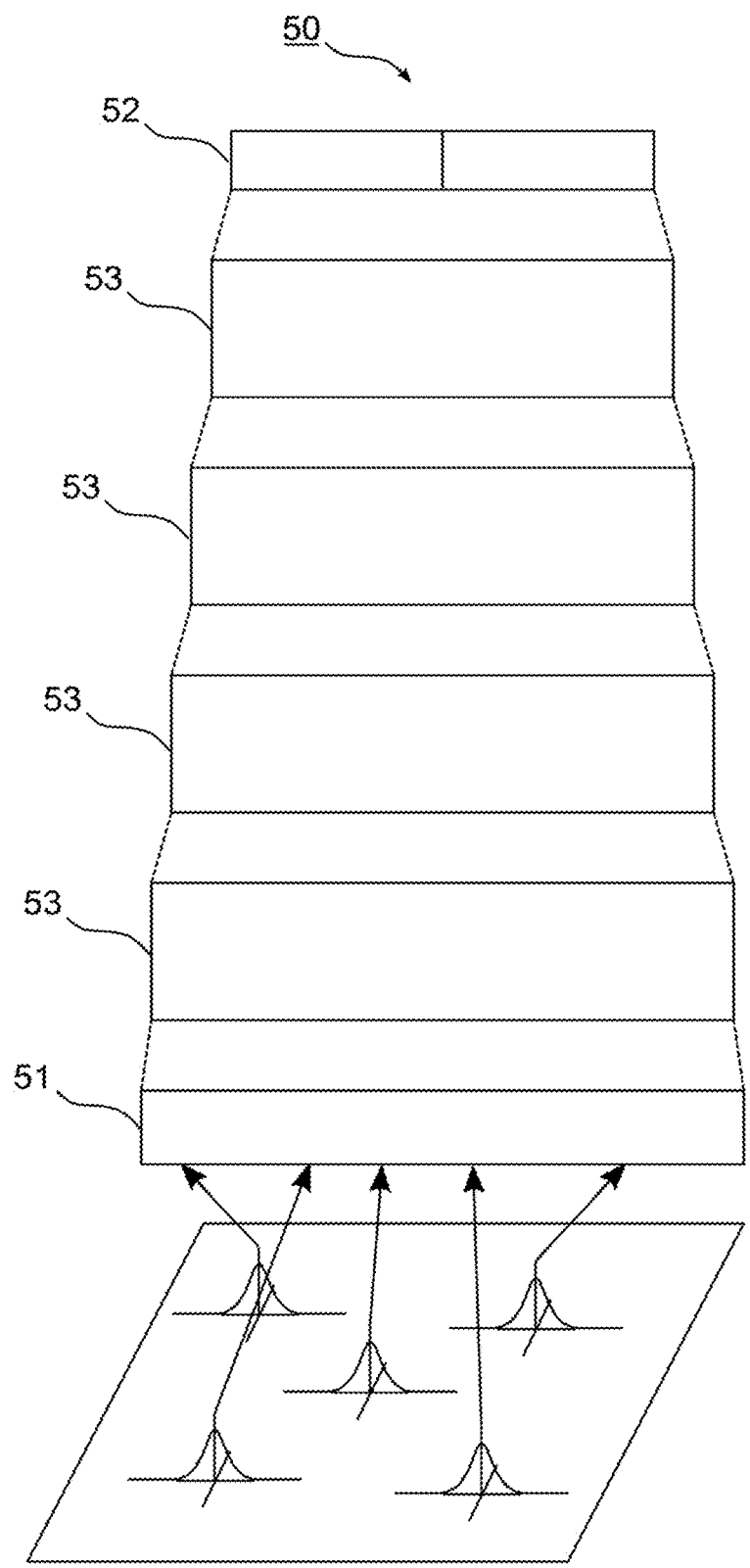
FIG. 14 shows a network with only shared layers.

FIG. 14 shows a network 50 with only shared dense or fully connected layers 53. The output of the output layer 52 is in this case a list of linked-together predictions for the left and right road edges. Here, too, the feature space 51 is a one-dimensional feature vector.

Figure 15:
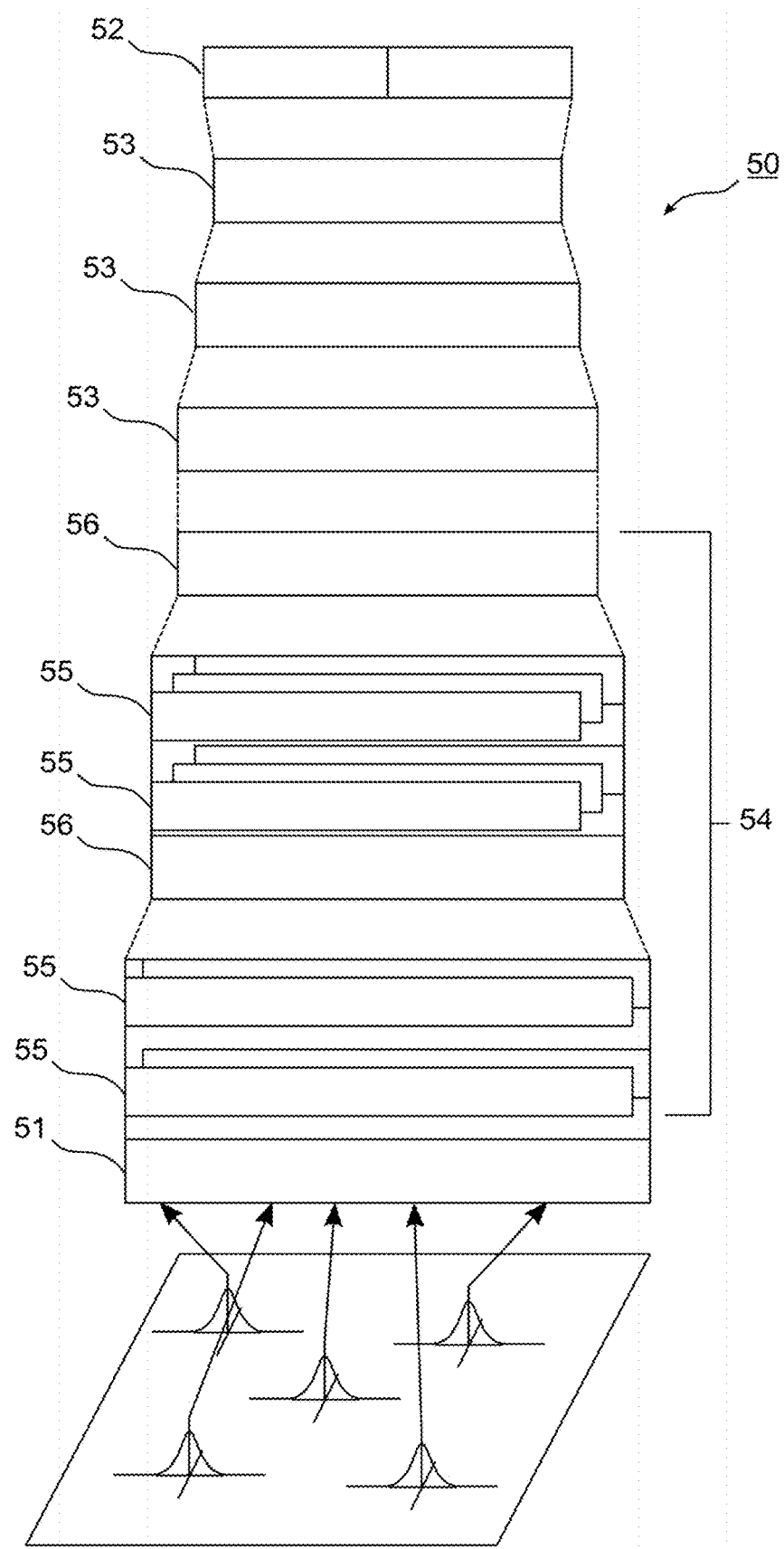
FIG. 15 shows a convolutional neural network that directly uses the output of the receptive field as an input variable.

FIG. 15 shows a network 50, in which a convolutional neural network 54 with a series of convolution layers 55 and subsampling layers 56 (Max Pooling Layer) is used. Once again, the convolutional neural network 54 is adjoined by several dense or fully connected layers 53. The feature space 51 consists of a grid of N×M values, which is derived from the one-dimensional feature vector provided by the receptive field. The 1D feature vector is transformed as it were into a low-resolution 2D image of the surrounding area.

Figure 16:
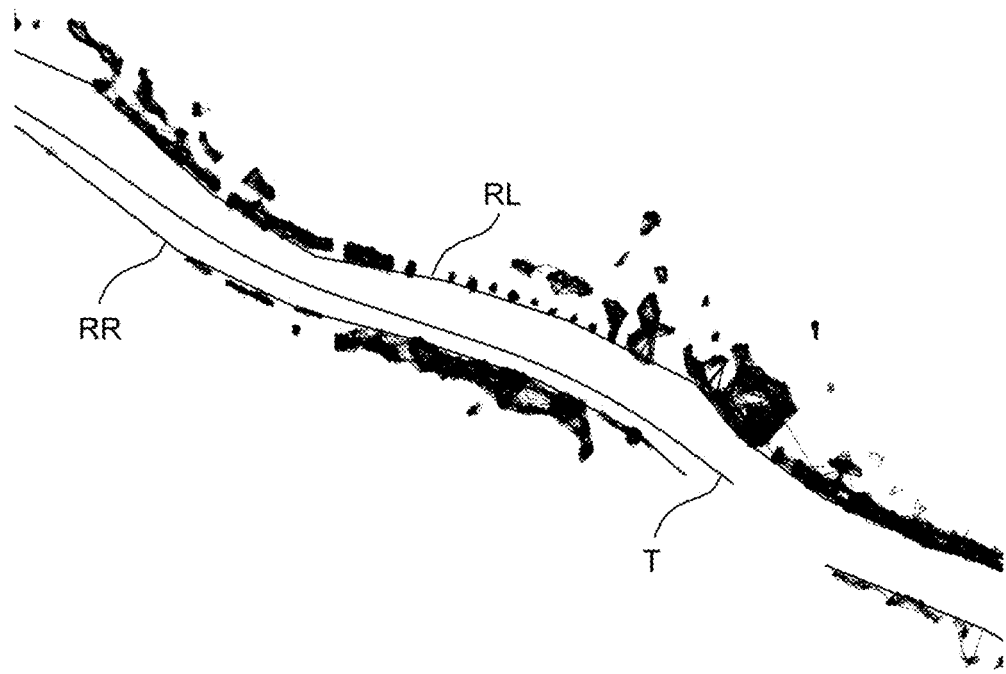
FIG. 16 shows a modeling of road edges with polygon progressions in an interactive tool.

For the training of the neural network, basic truths must be provided for the training data. This may be performed with the aid of an interactive tool. The road edges are in this case modeled as a set of polygon progressions. FIG. 16 shows an example of such modeling. In addition to the trajectory T, the left road edge RL and the right road edge RR can be seen, respectively represented by a polygon progression. The polygon progressions can be changed by a user of the interactive tool, in that points are displaced, added or removed, lines are divided into segments or neighboring segments are combined. If available, the basic truth can be initialized by an existing application, so that the characterization of the data does not have to be performed right from the beginning.

Figure 17:
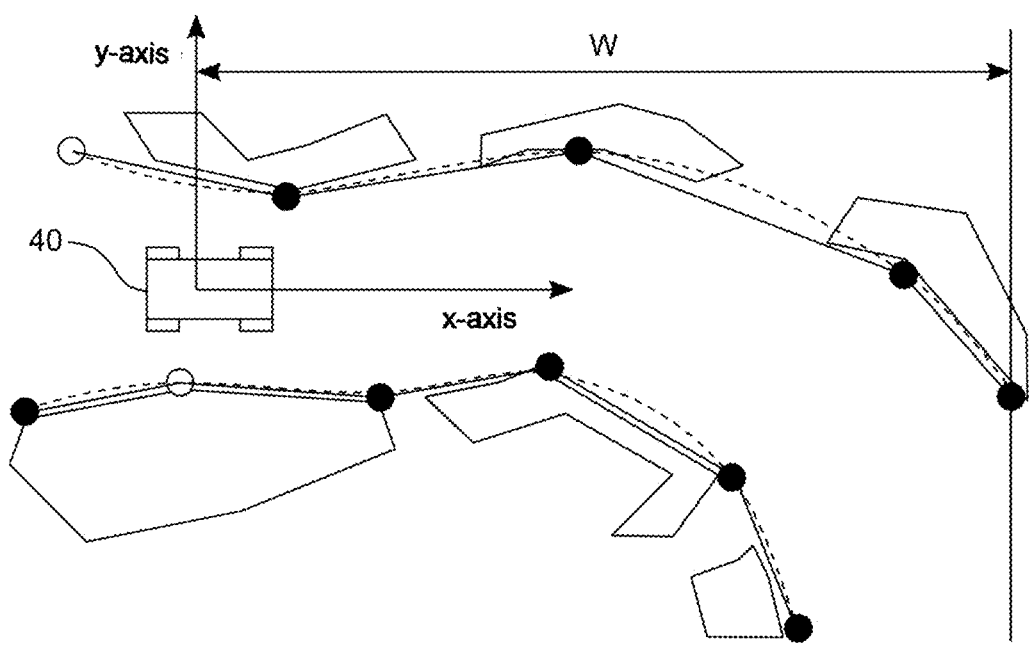
FIG. 17 shows an example of a scenario for polynomial fitting.

The characterized polygon progressions are time-independent and cannot be used directly as a frame-based basic truth. Therefore, additional steps are required. A local basic truth in the form of a polynomial is generated for each frame of the vehicle's own movement. The polynomial is then adapted to a subset of the points of the polygon progression. The window size and the transition point for the polynomial are in this case determined iteratively. FIG. 17 shows an example of a scenario for polynomial fitting. Polylines are transformed into the ego coordinate system and the first point behind the vehicle 40 along the x-axis and in a local vicinity is found. The corresponding points are marked by the non-filled circles. The polynomial fitting within a window W is implemented as a hierarchical approach for each of the two independent road borders. The dashed lines indicate a possible solution that is generated by the fitting algorithm.

A basic truth with a variable window size is obtained as a result of the modeling. In this case, a frame-based basic truth is available. The data may be used to evaluate or train models on the basis of examples. Preferably, the data are also subjected to a manual or automatic filtering. This may for example remove very short basic truth segments. Similarly removed may be segments for which there are too few radar clusters, in the case of which the basic truth for the right or left road edge is not available, in the case of which the fitting algorithm fails or which cannot be characterized.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for predicting a course of a road based at least in part on radar data of a radar sensor of a motor vehicle, comprising:
receiving the radar data;
accumulating the radar data in a measuring grid;
forming clusters for objects in the measuring grid;
generating cluster descriptions for the clusters;
transforming the clusters into a feature space by a receptive field configured as one or more of a regular grid, a hexagonal arrangement, a circular arrangement, and a circularly hexagonal arrangement;
processing the clusters to determine polynomials for describing road edges; and
outputting the polynomials that predict the course of the road and describe the road edges,
wherein a respective polynomial is generated for each frame of the a motor vehicle's movement.

2. The method as claimed in claim 1, wherein the cluster descriptions each comprise a center of a respective cluster and a description of an envelope of the respective cluster configured as an envelope polygon.

3. The method as claimed in claim 1, wherein, for the transformation into the feature space, the clusters are convoluted with individual receptors of the receptive field.

4. The method as claimed in claim 3, wherein respective centers of the individual receptors and covariance matrices of the individual receptors are determined manually or by evolutionary algorithms.

5. The method as claimed in claim 1, wherein the description of the clusters in the feature space is an input variable for a neural network.

6. The method as claimed in claim 5, wherein the neural network is trained for a regression of parameters of the polynomials for describing the road edges.

7. A computer program stored on a nontransitory computer-readable storage medium with instructions which, when executed by a computer, cause the computer to:
receive radar data;
accumulate the radar data in a measuring grid;
form clusters for objects in the measuring grid;
generate cluster descriptions for the clusters;
transform the clusters into a feature space by a receptive field configured as one or more of a regular grid, a hexagonal arrangement, a circular arrangement, and a circularly hexagonal arrangement;
process the clusters to determine polynomials for describing road edges;
output the polynomials; and predict a course of a road based on the radar data of a radar sensor of a motor vehicle, wherein a respective polynomial is generated for each frame of the a motor vehicle's movement.

8. A device for predicting the course of a road based on radar data of a radar sensor of a motor vehicle, wherein the device is designed to:

receive the radar data;
accumulate the radar data in a measuring grid;
form clusters for objects in the measuring grid;
generate cluster descriptions for the clusters;
transform the clusters into a feature space by a receptive field configured as one or more of a regular grid, a hexagonal arrangement, a circular arrangement, and a circularly hexagonal arrangement;
process the clusters to determine polynomials for describing road edges;
output the polynomials; and
predict a course of a road based on the radar data of a radar sensor of a motor vehicle,
wherein a respective polynomial is generated for each frame of the a motor vehicle's movement.

\* \* \* \* \*